(12) United States Patent
Thuilliez et al.

(10) Patent No.: US 12,134,694 B2
(45) Date of Patent: Nov. 5, 2024

(54) RUBBER COMPOSITION COMPRISING A POLYPHENOLIC COMPOUND

(71) Applicant: COMPAGNIE GENERALE DES ETABLISSEMENTS MICHELIN, Clermont-Ferrand (FR)

(72) Inventors: Anne-Lise Thuilliez, Clermont-Ferrand (FR); Odile Gavard-Lonchay, Clermont-Ferrand (FR)

( * ) Notice: Subject to any disclaimer, the term of this patent is extended or adjusted under 35 U.S.C. 154(b) by 792 days.

(21) Appl. No.: 17/278,044

(22) PCT Filed: Sep. 13, 2019

(86) PCT No.: PCT/FR2019/052139
§ 371 (c)(1),
(2) Date: Mar. 19, 2021

(87) PCT Pub. No.: WO2020/058613
PCT Pub. Date: Mar. 26, 2020

(65) Prior Publication Data
US 2021/0380784 A1    Dec. 9, 2021

(30) Foreign Application Priority Data
Sep. 21, 2018  (FR) ...................................... 1858590

(51) Int. Cl.
*C08L 7/00* (2006.01)
*B60C 1/00* (2006.01)

(52) U.S. Cl.
CPC .............. *C08L 7/00* (2013.01); *B60C 1/0041* (2013.01); *B60C 2001/0066* (2013.01); *C08L 2207/04* (2013.01); *C08L 2312/00* (2013.01)

(58) Field of Classification Search
CPC .... C08L 7/00; C08L 2207/04; C08L 2312/00; B60C 1/0041; B60C 2001/0066
USPC ........................................................ 524/58
See application file for complete search history.

(56) References Cited

U.S. PATENT DOCUMENTS

| | | | |
|---|---|---|---|
| 5,576,080 A | 11/1996 | Sugimoto et al. | |
| 6,610,261 B1 | 8/2003 | Custodero et al. | |
| 6,747,087 B2 | 6/2004 | Custodero et al. | |
| 6,903,165 B2 | 6/2005 | Yabui et al. | |
| 6,975,396 B2 | 12/2005 | Custodero et al. | |
| 7,135,517 B2 | 11/2006 | Simonot et al. | |
| 7,199,175 B2 | 4/2007 | Vasseur | |
| 7,202,295 B2 | 4/2007 | Simonot et al. | |
| 7,250,463 B2 | 7/2007 | Durel et al. | |
| 7,256,233 B2 | 8/2007 | Simonot et al. | |
| 7,425,313 B2 | 9/2008 | Custodero et al. | |
| 7,820,771 B2 | 10/2010 | Lapra et al. | |
| 7,900,667 B2 | 3/2011 | Vasseur | |
| 8,461,269 B2 | 6/2013 | Varagniat et al. | |
| 8,883,929 B2 | 11/2014 | Gandon-Pain et al. | |
| 10,544,292 B2 | 1/2020 | Doisneau et al. | |
| 10,544,298 B2 | 1/2020 | Doisneau et al. | |
| 10,590,225 B2 | 3/2020 | Thuilliez et al. | |
| 10,604,613 B2 | 3/2020 | Doisneau et al. | |
| 10,647,848 B2 | 5/2020 | Thuilliez et al. | |
| 10,711,131 B2 | 7/2020 | Thuilliez et al. | |
| 10,711,132 B2 | 7/2020 | Thuilliez et al. | |
| 11,241,370 B2 | 2/2022 | Valero et al. | |
| 2002/0004549 A1 | 1/2002 | Custodero et al. | |
| 2003/0120007 A1 | 6/2003 | Bortolotti et al. | |
| 2003/0202923 A1 | 10/2003 | Custodero et al. | |
| 2003/0212185 A1 | 11/2003 | Vasseur | |
| 2004/0030017 A1 | 2/2004 | Simonot et al. | |
| 2005/0004297 A1 | 1/2005 | Durel et al. | |
| 2005/0032965 A1 | 2/2005 | Valero | |
| 2005/0171264 A1 | 8/2005 | Simonot et al. | |
| 2005/0267242 A1 | 12/2005 | Custodero et al. | |
| 2006/0009564 A1 | 1/2006 | Simonot et al. | |
| 2007/0112120 A1 | 5/2007 | Vasseur | |
| 2008/0132644 A1 | 6/2008 | Lapra et al. | |
| 2009/0270558 A1 | 10/2009 | Gandon-pain et al. | |
| 2010/0022714 A1 | 1/2010 | Varagniat et al. | |
| 2010/0221541 A1 | 9/2010 | Valero et al. | |
| 2011/0021702 A1 | 1/2011 | Gandon-Pain et al. | |
| 2011/0098404 A1 | 4/2011 | Kwag et al. | |
| 2011/0263784 A1 | 10/2011 | Valero et al. | |
| 2012/0208948 A1 | 8/2012 | Gandon-Pain et al. | |
| 2013/0196085 A1 | 8/2013 | Voge et al. | |
| 2015/0299435 A1* | 10/2015 | Fleury .................... | C08K 5/092 523/156 |

(Continued)

FOREIGN PATENT DOCUMENTS

| | | |
|---|---|---|
| CN | 102746543 A | 10/2012 |
| CN | 107652558 A | 2/2018 |

(Continued)

OTHER PUBLICATIONS

S. Brunauer, et al., "Adsorption of Gases in Multimolecular Layers", J. Am. Chem. Soc., vol. 60, pp. 309-319 (1938).

J.J. Yu, et al., "Ultraviolet-Initiated Photografting of Glycidyl Methacrylate onto Styrene-Butadiene Rubber", J. Appl. Polymer Sci., vol. 73, pp. 1733-1739 (1999).

N.M. Ahmad, et al., "Chain Transfer to Polymer in Free-Radical Solution Polymerization of n-Butyl Acrylate Studied by NMR Spectroscopy", Macromolecules 1998, 31, 2822-2827.

(Continued)

*Primary Examiner* — Ling Siu Cho
*Assistant Examiner* — Ronald Grinsted
(74) *Attorney, Agent, or Firm* — VENABLE LLP

(57) ABSTRACT

A rubber composition is based on at least one elastomer, a reinforcing filler, a crosslinking system and at least one polyphenolic compound, the polyphenolic compound comprising at least three aromatic rings, each bearing at least two vicinal hydroxyl groups, and a composite is based on the rubber composition and at least one reinforcing element comprising a metallic surface.

11 Claims, No Drawings

(56) References Cited

U.S. PATENT DOCUMENTS

| | | |
|---|---|---|
| 2015/0322234 A1 | 11/2015 | Fleury et al. |
| 2018/0326786 A1* | 11/2018 | Thuilliez ................ C08J 5/041 |
| 2018/0371141 A1 | 12/2018 | Thuilliez et al. |
| 2021/0087356 A1 | 3/2021 | Thuilliez et al. |
| 2021/0087366 A1 | 3/2021 | Thuilliez et al. |
| 2021/0347966 A1 | 11/2021 | Gavard-Lonchay et al. |
| 2022/0025163 A1 | 1/2022 | Gavard-Lonchay et al. |
| 2022/0064415 A1 | 3/2022 | Gavard-Lonchay et al. |

FOREIGN PATENT DOCUMENTS

| | | |
|---|---|---|
| EP | 0247580 A2 | 12/1987 |
| EP | 0763564 A2 | 3/1997 |
| EP | 1403287 A1 | 3/2004 |
| JP | 2000160479 A * | 6/2000 |
| JP | 2010-59327 A | 3/2010 |
| JP | 2011-252107 A | 12/2011 |
| KR | 10-2014-0126489 A | 10/2014 |
| WO | 97/36724 A2 | 10/1997 |
| WO | 99/16600 A1 | 4/1999 |
| WO | 99/28376 A2 | 6/1999 |
| WO | 00/73372 A1 | 12/2000 |
| WO | 02/10269 A2 | 2/2002 |
| WO | 02/053634 A1 | 7/2002 |
| WO | 03/016215 A1 | 2/2003 |
| WO | 03/016387 A1 | 2/2003 |
| WO | 2004/003067 A1 | 1/2004 |
| WO | 2004/056915 A1 | 7/2004 |
| WO | 2006/069792 A1 | 7/2006 |
| WO | 2006/069793 A1 | 7/2006 |
| WO | 2008/003434 A1 | 1/2008 |
| WO | 2008/003435 A1 | 1/2008 |
| WO | 2011/092124 A1 | 8/2011 |
| WO | 2014/095582 A1 | 6/2014 |
| WO | 2014/095585 A1 | 6/2014 |
| WO | 2017/064091 A1 | 4/2017 |
| WO | 2017/081387 A1 | 5/2017 |
| WO | 2017/081388 A1 | 5/2017 |
| WO | 2017/103387 A1 | 6/2017 |

OTHER PUBLICATIONS

M.M. Jacobi, et al., "Study of the Epoxidation of Polydiene Rubbers Ii", KGK Kautschuk Gummi Kunststoffe 57, Jahrgang, Nr. Mar. 2004, pp. 82-89.

W.W. Wright, et al., "Polyimides", Ullmann's Encyclopedia of Industrial Chem., Wiley-VCH, Weinheim, vol. 29, pp. 39-58 (2002).

International Search Report dated Dec. 16, 2019, in corresponding PCT/FR2019/052139 (6 pages).

* cited by examiner

RUBBER COMPOSITION COMPRISING A POLYPHENOLIC COMPOUND

TECHNICAL FIELD OF THE INVENTION

The present invention relates to rubber compositions based on elastomers, to the composites comprising such compositions, and also to the tyres comprising such compositions or such composites.

PRIOR ART

Plies for the reinforcement of tyres usually comprise a rubber mixture and reinforcing cords, which are often metallic and covered at the surface with brass. Since these plies are subject to high stresses during the rolling of the tyres, it is understood that the adhesion between the rubber and the reinforcing elements is a key property.

The adhesion function generally imposes specific formulations on the rubber mixture, in particular the need for a high content of sulfur and of zinc oxide, a low amount of stearic acid, the presence of cobalt salt and the use of an accelerator having a long delay phase. In point of fact, these vulcanization systems having a high sulfur content constitute a major constraint during the manufacture of semi-finished articles, in particular in order to avoid premature crosslinking phenomena.

It would thus be advantageous for tyre manufacturers to find rubber composition formulations which make it possible to lower the sulfur contents, indeed even to dispense with sulfur, in the composites while making possible good adhesion to the reinforcing cords, whether or not they are covered with a specific metal or alloy.

The documents WO 2017/081387 and WO 2017/081388 present a rubber composition and a composite based on a polymer matrix comprising a functional diene polymer. This functional diene polymer bears at least one aromatic group substituted by at least two vicinal hydroxyl functions. The crosslinking of the rubber composition is carried out by a vulcanization system or a system based on one or more peroxide compounds. Good properties of adhesion of the rubber composition to the metal are obtained, but require the use of a grafted polymer.

Application JP 2011252107 describes a rubber composition having good adhesion to metal, this composition comprising a diene elastomer and cobalt salt. Gallic acid or a gallic acid hydrate facilitates the dissociation of the cobalt salt. The composition is crosslinked with a sulfur-based system. Although exhibiting good adhesion characteristics, this composition employs both sulfur and a cobalt salt.

On continuing its research studies, the Applicant Company has discovered a rubber composition comprising a specific polyphenolic compound, which exhibits very good adhesion characteristics both with sulfur-based crosslinking systems, including with low sulfur contents, and with sulfur-free crosslinking systems. The composition according to the invention makes it possible in particular to obtain an excellent adhesion without the presence of cobalt salts, this being the case whether or not the cord is covered with a specific metal or alloy.

DETAILED DESCRIPTION OF THE INVENTION

The invention relates to a rubber composition based on at least one elastomer, a reinforcing filler, a crosslinking system and at least one polyphenolic compound, the polyphenolic compound comprising at least three aromatic rings comprising 6 carbon atoms, each bearing at least two vicinal hydroxyl groups.

Definitions

The expression "composition based on" should be understood as meaning a composition comprising the mixture and/or the product of the in situ reaction of the various constituents used, some of these constituents being able to react and/or being intended to react with one another, at least partially, during the various phases of manufacture of the composition; it thus being possible for the composition to be in the completely or partially crosslinked state or in the noncrosslinked state.

The expression "part by weight per hundred parts by weight of elastomer" (or phr) should be understood as meaning, within the meaning of the present invention, the part by mass per hundred parts by mass of elastomer.

In the present document, unless expressly indicated otherwise, all the percentages (%) indicated are percentages (%) by weight.

Moreover, any interval of values denoted by the expression "between a and b" represents the range of values extending from more than a to less than b (that is to say, limits a and b excluded), whereas any interval of values denoted by the expression "from a to b" means the range of values extending from a up to b (that is to say, including the strict limits a and b).

The compounds comprising carbon mentioned in the description can be of fossil origin or be biosourced. In the latter case, they can result, partially or completely, from biomass or be obtained from renewable starting materials resulting from biomass. Polymers, plasticizers, fillers, and the like, are concerned in particular.

Elastomer

The composition according to the invention comprises at least one elastomer, preferably chosen from diene, olefinic and thermoplastic elastomers and their mixtures.

Diene Elastomer

"Diene" elastomer (or, without distinction, rubber), whether natural or synthetic, should be understood, in a known way, as meaning an elastomer composed, at least in part (i.e., a homopolymer or a copolymer), of diene monomer units (monomers bearing two conjugated or non-conjugated carbon-carbon double bonds).

These diene elastomers can be classified into two categories: "essentially unsaturated" or "essentially saturated". "Essentially unsaturated" is understood to mean generally a diene elastomer resulting at least in part from conjugated diene monomers having a content of units of diene origin (conjugated dienes) which is greater than 15% (mol %); thus it is that diene elastomers such as butyl rubbers or copolymers of dienes and of α-olefins of EPDM type do not come within the preceding definition and can in particular be described as "essentially saturated" diene elastomers (low or very low content, always less than 15%, of units of diene origin). The diene elastomers included in the composition according to the invention are preferentially essentially unsaturated.

Diene elastomer capable of being used in the compositions in accordance with the invention is understood particularly to mean:

(a) any homopolymer of a conjugated or non-conjugated diene monomer having from 4 to 18 carbon atoms;
(b) any copolymer of a conjugated or non-conjugated diene having from 4 to 18 carbon atoms and of at least one other monomer.

The other monomer can be ethylene, an olefin or a conjugated or non-conjugated diene.

Suitable as conjugated dienes are conjugated dienes having from 4 to 12 carbon atoms, especially 1,3-dienes, such as, in particular, 1,3-butadiene and isoprene.

Suitable as olefins are vinylaromatic compounds having from 8 to 20 carbon atoms and aliphatic α-monoolefins having from 3 to 12 carbon atoms.

Suitable as vinylaromatic compounds are, for example, styrene, ortho-, meta- or para-methylstyrene, the "vinyltoluene" commercial mixture or para-(tert-butyl)styrene.

Suitable as aliphatic α-monoolefins are in particular acyclic aliphatic α-monoolefins having from 3 to 18 carbon atoms.

Preferentially, the diene elastomer is selected from the group consisting of polybutadienes (BRs), natural rubber (NR), synthetic polyisoprenes (IRs), butadiene copolymers, isoprene copolymers and the mixtures of these elastomers. The butadiene copolymers are particularly selected from the group consisting of butadiene/styrene copolymers (SBRs).

Preferably, the diene elastomer is an isoprene elastomer.

The term "isoprene elastomer" is understood to mean, in a known way, an isoprene homopolymer or copolymer, in other words a diene elastomer selected from the group consisting of natural rubber (NR), synthetic polyisoprenes (IRs), the various isoprene copolymers and the mixtures of these elastomers. Mention will in particular be made, among isoprene copolymers, of isobutene/isoprene (butyl rubber—IIR), isoprene/styrene (SIR), isoprene/butadiene (BIR) or isoprene/butadiene/styrene (SBIR) copolymers. This isoprene elastomer is preferably selected from the group consisting of natural rubber, synthetic cis-1,4-polyisoprenes and their mixtures; use is preferably made, among these synthetic polyisoprenes, of polyisoprenes having a content (mol %) of cis-1,4-bonds of greater than 90%, more preferentially still of greater than 98%. Preferably and according to any one of the arrangements of the present document, the diene elastomer is natural rubber.

Preferentially, the content of diene elastomer, preferably of isoprene elastomer, preferably natural rubber, is from 50 to 100 phr, more preferentially from 60 to 100 phr, in a more preferential way from 70 to 100 phr, more preferentially still from 80 to 100 phr and in a very preferential way from 90 to 100 phr. In particular, the content of diene elastomer, preferably of isoprene elastomer, preferably again of natural rubber, is very preferentially 100 phr.

Whether it contains just one diene elastomer or a mixture of several diene elastomers, the rubber composition according to the invention can also contain, in a minor way, any type of synthetic elastomer other than a diene elastomer, indeed even polymers other than elastomers, for example thermoplastic polymers.

Preferably, the rubber composition according to the invention does not contain a synthetic elastomer other than a diene elastomer or a polymer other than elastomers or contains less than 10 phr, preferably less than 5 phr, thereof.

Olefinic Elastomer

Olefinic elastomer is understood to mean, within the meaning of the present invention, an elastomer, the elastomeric chain of which is a carbon-based chain predominantly comprising olefin monomer units which are denoted O.

The monomers O can originate from any olefin known to a person skilled in the art, such as, for example, ethylene, propylene, butylene or isobutylene, these monomers optionally being substituted by linear or branched alkyl groups.

Preferentially, O is an ethylene [—$CH_2$—$CH_2$-] unit and, in this preferential case, the olefinic elastomer is an ethylenic elastomer.

The molar content of O is greater than 50%. More specifically, the molar content of O is between 50% and 100%, preferentially between 50% and 95%, preferentially between 65% and 85%. The olefinic elastomer, within the meaning of the present invention, is thus a copolymer also comprising from 0 to 50 mol % of non-olefinic units, that is to say units other than O.

The non-olefinic units, denoted A', are present in the carbon-based chain so that the total molar content represented by the monomers O and A' is equal to 100%. The non-olefinic monomers of use in the preparation of the olefinic elastomers can be chosen from non-olefinic monomers not resulting in unsaturations and monomers which, once polymerized, result in unsaturations borne by the elastomer chain (other than diene monomers).

The non-olefinic monomers not resulting in unsaturations are essentially vinyl and acrylic/methacrylic monomers. For example, such monomers can be chosen from styrene, vinyl acetate, vinyl alcohol, acrylonitrile, methyl acrylate or methyl methacrylate, these monomers optionally being substituted by alkyl or aryl groups or other functionalized groups.

For example also, the non-diene monomers of use in the preparation of the olefinic elastomers bearing unsaturations by copolymerization are all those known to a person skilled in the art for forming unsaturated elastomers, such as, for example, dicyclopentadienyloxyethyl methacrylate.

Thermoplastic Elastomer (TPE)

Thermoplastic elastomers is understood to mean, within the meaning of the present invention, thermoplastic elastomers (abbreviated to TPEs) which have a structure intermediate between thermoplastic polymers and elastomers. They are block copolymers consisting of rigid thermoplastic blocks connected by flexible elastomer blocks.

The thermoplastic elastomer preferentially included in the composition according to the invention is a block copolymer, the chemical nature of the thermoplastic and elastomer blocks of which can vary.

In a known way, TPEs exhibit two glass transition temperature ("Tg", measured according to Standard ASTM D3418) peaks, the lowest temperature being relative to the elastomer part of the TPE and the highest temperature being relative to the thermoplastic part of the TPE. Thus, the flexible blocks of the TPEs are defined by a Tg which is less than ambient temperature (25° C.), while the rigid blocks have a Tg of greater than 80° C.

In the present patent application, when reference is made to the glass transition temperature of the TPE, it concerns the Tg relative to the elastomer block. The TPE exhibits a glass transition temperature which is preferentially less than or equal to 25° C., more preferentially less than or equal to 10° C. A Tg value greater than these minima can reduce the performance qualities of the composition according to the invention when used at very low temperature; for such a use, the Tg of the TPE is more preferentially still less than or equal to −10° C. Preferentially also, the Tg of the TPE is greater than −100° C.

In order to be both elastomeric and thermoplastic in nature, the TPE has to be provided with blocks which are sufficiently incompatible (that is to say, different as a result of their respective masses, of their respective polarities or of their respective Tg values) to retain their own properties of elastomer or thermoplastic block.

The TPEs can be copolymers with a small number of blocks (less than 5, typically 2 or 3), in which case these blocks preferably have high weights of greater than 15 000 g/mol. These TPEs can, for example, be diblock copolymers, comprising a thermoplastic block and an elastomer block. These are often also triblock elastomers with two rigid segments connected by a flexible segment. The rigid and flexible segments can be positioned linearly, in a star-branched or branched configuration. Typically, each of these segments or blocks often contains a minimum of more than 5, generally of more than 10, base units (for example, styrene units and butadiene units for a styrene/butadiene/styrene block copolymer).

The TPEs can also comprise a large number of smaller blocks (more than 30, typically from 50 to 500), in which case these blocks preferably have relatively low weights, for example from 500 to 5000 g/mol; these TPEs will be referred to subsequently as multiblock TPEs and are an elastomer block/thermoplastic block sequence.

The TPE can be provided in a linear form, star-branched form with at least three branches, branched form or dendrimer form.

For example, the TPE is a copolymer selected from the following group: styrene/isobutylene/styrene (SIBS), styrene/butadiene/styrene (SBS), styrene/isoprene/styrene (SIS), polybutadiene/polyurethane (TPU), polyether/polyester (COPE) and polyether/polyamide (PEBA).

It is also possible for the TPEs given as example above to be mixed with one another within the composition according to the invention.

Mention may be made, by way of examples of commercially available TPE elastomers, of the elastomers of SIS type sold by Kuraray under the name Hybrar 5125 or sold by Kraton under the name D1161, or also of the elastomers of linear SBS type sold by Polimeri Europa under the name Europrene SOLT 166 or of star-branched SBS type sold by Kraton under the name D1184. Mention may also be made of the elastomers sold by Dexco Polymers under the Vector name (e.g. Vector 4114 or Vector 8508). Mention may be made, among the multiblock TPEs, of the Vistamaxx TPE sold by Exxon; of the COPE TPE sold by DSM under the name Arnitel or by DuPont under the name Hytrel or by Ticona under the name Riteflex; of the PEBA TPE sold by Arkema under the name PEBAX; or of the TPU TPE sold by Sartomer under the name TPU 7840 or by BASF under the name Elastogran.

Functionalization

In a specific arrangement, the composition according to the invention comprises at least one functionalized elastomer. The term "functionalized" is understood to mean that it bears a functional group, preferentially a functional group comprising a function such as a conjugated diene function, an epoxide function, a carbonyl function, an anhydride function or an acid ester function.

The functions present in the elastomer are obtained, in a way known to a person skilled in the art, by copolymerization or by post-polymerization modification, and are either borne directly by the backbone of the chain or are borne by a side group, depending on the method of preparation.

In a preferred arrangement, the composition according to the invention comprises at least one functionalized elastomer comprising a conjugated diene function.

"Conjugated diene function", which is well known to a person skilled in the art, is understood to mean the presence of two successive carbon-carbon double bonds, which can be located either along the chain of the elastomer or on a branch of the elastomeric chain, in which case reference will be made to pendant function.

In another preferred arrangement, the rubber composition according to the invention comprises at least one epoxide-functionalized elastomer and preferably one epoxidized diene elastomer.

The epoxide functions present in the elastomer are obtained by copolymerization or by post-polymerization modification and will either be borne directly by the backbone of the chain or will be borne by a side group, depending on the method of preparation, for example by epoxidation or any other modification of diene functions present in the elastomeric chain after copolymerization.

The epoxidized elastomers can, for example, be obtained in a known way by epoxidation of the equivalent non-epoxidized elastomer, for example by processes based on chlorohydrin or on bromohydrin or processes based on hydrogen peroxides, on alkyl hydroperoxides or on peracids (such as peracetic acid or performic acid); see in particular Kautsch. Gummi Kunstst., 2004, 57(3), 82. The epoxide functions are then in the polymer chain. Mention may in particular be made of epoxidized natural rubbers (abbreviated to ENRs); such ENRs are, for example, sold under the names ENR-25 and ENR-50 (respective degrees of epoxidation of 25% and 50%) by Guthrie Polymer. Epoxidized BRs are themselves also well known, for example sold by Sartomer under the name Poly Bd (for example, Poly Bd 605E). Epoxidized SBRs can be prepared by epoxidation techniques well known to a person skilled in the art.

The epoxidized elastomers can also exhibit pendant epoxide functions. In this case, they can be obtained either by post-polymerization modification (see, for example, J. Appl. Polym. Sci., 1999, 73, 1733) or by radical copolymerization of the monomers with monomers bearing epoxide functions, in particular esters of methacrylic acid comprising epoxide functions, such as, for example, glycidyl methacrylate (radical polymerization well known to a person skilled in the art of polymer synthesis; see, for example, Macromolecules, 1998, 31, 2822, or US20110098404), or by the use of nitrile oxides bearing epoxide functions.

Diene elastomers bearing epoxide groups have been described, for example, in US 2003/120007 or EP 0 763 564, U.S. Pat. No. 6,903,165 or EP 1 403 287.

Epoxidized olefinic elastomers and their processes of preparation are well known to a person skilled in the art. Olefinic elastomers bearing epoxide groups have been described, for example, in the documents EP 0 247 580 and U.S. Pat. No. 5,576,080. Arkema commercially provides epoxidized polyethylenes under the trade names Lotader AX8840 and Lotader AX8900.

In the preferred case where the epoxidized elastomer is an epoxidized diene elastomer, it is preferentially selected from the group consisting of epoxidized natural rubbers (NRs) (abbreviated to ENRs), epoxidized synthetic polyisoprenes (IRs), epoxidized polybutadienes (BRs) preferentially having a content of cis-1,4-bonds of greater than 90%, epoxidized butadiene/styrene copolymers (SBRs) and the mixtures of these elastomers.

Crosslinking System

The crosslinking system can be any type of system known to a person skilled in the art in the field of tyre rubber compositions.

In a way known to a person skilled in the art, the elastomers can be crosslinked in several ways depending on the nature of the said elastomers.

In the specific arrangement where the elastomer is predominantly a thermoplastic elastomer, it is possible not to use any crosslinking system and the solidification of the thermoplastic blocks may be sufficient to effectively stiffen the elastomer by a form of physical crosslinking of the thermoplastic blocks. In another specific arrangement where the elastomer is predominantly a thermoplastic elastomer, the crosslinking system can preferentially be based on one or more peroxide compounds, such as described, for example, in the document WO 2017/103387, or else the crosslinking can be carried out by radiation, such as described, for example, in the document WO 2017/064091.

In the specific arrangement where the elastomer making up the rubber composition according to the invention predominantly comprises diene elastomers, the crosslinking system can be based on sulfur or on one or more peroxide compounds or based on one or more compounds of thiuram polysulfide type.

When the elastomer of the composition according to the invention is functionalized, specific crosslinking agents can be used, according to the nature of the function borne by the elastomer. Thus, it is possible in particular to crosslink the epoxidized elastomers described above by polyacids, or to crosslink the elastomers exhibiting conjugated double bonds described above by polydienophiles.

Sulfur

In the specific case where the composition according to the invention comprises a diene elastomer, the crosslinking system can preferentially be based on sulfur. Reference is then made to a vulcanization system. The sulfur can be contributed in any form, in particular in the form of molecular sulfur or of a sulfur-donating agent. At least one vulcanization accelerator is also preferably present, and, optionally, also preferentially, use may be made of various known vulcanization activators, such as zinc oxide, stearic acid or equivalent compound, such as stearic acid salts, and salts of transition metals, guanidine derivatives (in particular diphenylguanidine), or also known vulcanization retarders.

The sulfur is used at a preferential content of between 0.5 and 12 phr, in particular between 1 and 10 phr. The vulcanization accelerator is used at a preferential content of between 0.5 and 10 phr, more preferentially of between 0.5 and 5 phr and very preferentially of between 0.5 and 3 phr.

Use may be made, as accelerator, of any compound capable of acting as accelerator of the vulcanization of diene elastomers in the presence of sulfur, in particular accelerators of the thiazole type, and also their derivatives, or accelerators of sulfenamide, thiuram, dithiocarbamate, dithiophosphate, thiourea and xanthate types. Mention may in particular be made, as examples of such accelerators, of the following compounds: 2-mercaptobenzothiazyl disulfide (abbreviated to MBTS), N-cyclohexyl-2-benzothiazolesulfenamide (CBS), N,N-dicyclohexyl-2-benzothiazolesulfenamide (DCBS), N-(tert-butyl)-2-benzothiazolesulfenamide (TBBS), N-(tert-butyl)-2-benzothiazolesulfenimide (TBSI), tetrabenzylthiuram disulfide (TBZTD), zinc dibenzyldithiocarbamate (ZBEC) and the mixtures of these compounds.

Peroxides

In the specific case where the composition according to the invention comprises a diene elastomer or a thermoplastic elastomer, the crosslinking system is preferentially based on one or more peroxide compounds, the said peroxide compound(s) representing from 0.01 to 10 phr.

The peroxide which can be used according to the invention can be any peroxide known to a person skilled in the art.

Preferably, the peroxide is chosen from organic peroxides.

"Organic peroxide" is understood to mean an organic compound, that is to say a compound containing carbon, comprising an —O—O— group (two oxygen atoms bonded by a single covalent bond).

During the crosslinking process, the organic peroxide decomposes at its unstable O—O bond to give free radicals. These free radicals make possible the creation of the crosslinking bonds.

According to one embodiment, the organic peroxide is selected from the group consisting of dialkyl peroxides, monoperoxycarbonates, diacyl peroxides, peroxyketals, peroxyesters and their mixtures.

Preferably, the dialkyl peroxides are selected from the group consisting of dicumyl peroxide, di(t-butyl) peroxide, t-butyl cumyl peroxide, 2,5-dimethyl-2,5-di(t-butylperoxy)hexane, 2,5-dimethyl-2,5-di(t-amylperoxy)hexane, 2,5-dimethyl-2,5-di(t-butylperoxy)hex-3-yne, 2,5-dimethyl-2,5-di(t-amylperoxy)hex-3-yne, α,α'-di[(t-butylperoxy)isopropyl]benzene, α,α'-di[(t-amylperoxy)isopropyl]benzene, di(t-amyl) peroxide, 1,3,5-tri[(t-butylperoxy)isopropyl]benzene, 1,3-dimethyl-3-(t-butylperoxy)butanol, 1,3-dimethyl-3-(t-amylperoxy)butanol and their mixtures.

A mixture of dicumyl peroxide and of 1,3- and 1,4-isopropylcumyl cumyl peroxide (sold, for example, by Arkema under the trade name Luperox® DC60) is also advantageous.

Some monoperoxycarbonates, such as OO-tert-butyl O-(2-ethylhexyl) monoperoxycarbonate, OO-tert-butyl O-isopropyl monoperoxycarbonate, OO-tert-amyl O-(2-ethylhexyl) monoperoxycarbonate and their mixtures, can also be used.

Among the diacyl peroxides, the preferred peroxide is benzoyl peroxide.

Among the peroxyketals, the preferred peroxides are selected from the group consisting of 1,1-di(t-butylperoxy)-3,3,5-trimethylcyclohexane, n-butyl 4,4-di(t-butylperoxy)valerate, ethyl 3,3-di(t-butylperoxy)butyrate, 2,2-di(t-amylperoxy)propane, 3,6,9-triethyl-3,6,9-trimethyl-1,4,7-triperoxynonane (or methyl ethyl ketone peroxide cyclic trimer), 3,3,5,7,7-pentamethyl-1,2,4-trioxepane, n-butyl 4,4-bis(t-amylperoxy)valerate, ethyl 3,3-di(t-amylperoxy)butyrate, 1,1-di(t-butylperoxy)cyclohexane, 1,1-di(t-amylperoxy)cyclohexane and their mixtures.

Preferably, the peroxyesters are selected from the group consisting of tert-butyl peroxybenzoate, tert-butyl peroxy-2-ethylhexanoate, tert-butyl peroxy-3,5,5-trimethylhexanoate and their mixtures.

Particularly preferably, the organic peroxide is selected from the group consisting of dicumyl peroxide, aryl or diaryl peroxides, diacetyl peroxide, benzoyl peroxide, dibenzoyl peroxide, di(tert-butyl) peroxide, tert-butyl cumyl peroxide, 2,5-bis(tert-butylperoxy)-2,5-dimethylhexane, n-butyl 4,4-di(tert-butylperoxy)valerate, OO-(t-butyl) O-(2-ethylhexyl) monoperoxycarbonate, tert-butyl peroxyisopropyl carbonate, tert-butyl peroxybenzoate, tert-butyl peroxy-3,5,5-trimethylhexanoate, 1,3(4)-bis(tert-butylperoxyisopropyl)benzene and the mixtures of the latter, more preferentially from the group consisting of dicumyl peroxide, n-butyl 4,4-di(tert-butylperoxy)valerate, OO-(t-butyl) O-(2-ethylhexyl)

monoperoxycarbonate, tert-butyl peroxyisopropyl carbonate, tert-butyl peroxybenzoate, tert-butyl peroxy-3,5,5-trimethylhexanoate, 1,3(4)-bis(tert-butylperoxyisopropyl)benzene and the mixtures of the latter.

Thiuram Polysulfide

In the specific case where the composition according to the invention comprises a diene elastomer, the crosslinking system is preferentially based on one or more compounds of thiuram polysulfide type, the said thiuram polysulfide compound(s) representing from 0.5 to 15 phr.

After curing, such a crosslinking agent proves to contribute sufficient cohesion to the composition, without conferring true crosslinking on it: the crosslinking which can be measured, via a conventional swelling method known to a person skilled in the art, in fact is close to the detection threshold. Preferably, the thiuram polysulfide content is between 0.5 and 10 phr, more preferentially within a range from 1 to 5 phr. Such compounds are known to a person skilled in the art and are described, for example, in the document WO 2011/092124. Mention may be made, as thiuram polysulfide compounds which can be used as chemical crosslinking system, of tetrabenzylthiuram disulfide (TBzTD), tetramethylthiuram disulfide (TMTD), dipentamethylenethiuram tetrasulfide (DPTT) and the mixtures of such compounds.

Polyacids

In the specific case where the composition according to the invention comprises an epoxide-functionalized elastomer, the crosslinking system is preferentially based on one or more polyacid compounds, the said polyacid compound(s) representing from 0.2 to 100 phr, preferably from 0.2 to 50 phr, more preferentially from 0.9 to 25 phr.

Polyacid compound, such as a diacid, is understood to mean a compound comprising several carboxylic acid functions, for example two carboxylic acid functions, borne on either side of a group A, A being a divalent hydrocarbon group comprising from 1 to 1800 carbon atoms. Such compounds are described, for example, in Application WO 2014/095582. The said crosslinking system based on one or more polyacid compounds also comprises an imidazole representing from 0.01 to 4 molar equivalents, preferably from 0.01 to 3 molar equivalents, with respect to the carboxylic acid functions present on the polyacid compound(s). Mention may be made, as imidazole compounds which can be used in the chemical crosslinking system, of 1,2-dimethylimidazole, 1-decyl-2-methylimidazole or 1-benzyl-2-methylimidazole, the latter being preferential.

The expression "molar equivalent", which is well known to a person skilled in the art, should be understood as meaning the quotient of the number of moles of the compound or of a function concerned to the number of moles of the reference compound or of reference function. Thus, 2 equivalents of a compound or of function B with respect to a compound or a function A represent 2 mol of the compound or of function B when 1 mol of the compound or of function A is used.

Polydienophile

In the specific case where the composition according to the invention comprises a functionalized elastomer comprising a conjugated diene function, the crosslinking system is preferentially based on one or more polydienophiles.

Suitable in particular are the compounds of general formula (I):

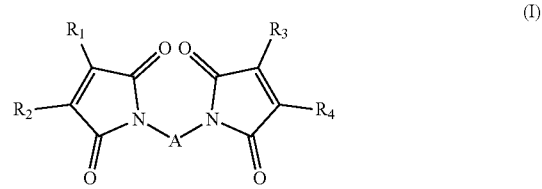

in which

A represents a covalent bond or a hydrocarbon group comprising at least 1 carbon atom, which is optionally substituted and optionally interrupted by one or more heteroatoms, $R_1$, $R_2$, $R_3$ and $R_4$ represent, independently of one another, identical or different groups chosen from a hydrogen atom and hydrocarbon groups, it being possible for $R_1$ and $R_2$, on the one hand, and $R_3$ and $R_4$, on the other hand, to form, together with the carbon atoms of the ring to which they are attached, a ring.

Preferably, in the polydienophile of general formula (I), A represents a covalent bond or a divalent hydrocarbon group comprising from 1 to 1800 carbon atoms, preferentially from 2 to 300 carbon atoms, more preferentially from 2 to 100 carbon atoms and very preferentially from 2 to 50 carbon atoms. Above 1800 carbon atoms, the polydienophile is a less effective crosslinking agent. Thus, A preferably represents a divalent hydrocarbon group comprising from 3 to 50 carbon atoms, preferentially from 5 to 50 carbon atoms, more preferentially from 8 to 50 carbon atoms and more preferentially still from 10 to 40 carbon atoms.

Preferentially, A is a divalent group of aliphatic or aromatic type or a group comprising at least an aliphatic part and an aromatic part, and preferably a divalent group of aromatic type or a group comprising at least an aliphatic part and an aromatic part. More preferentially, A is a divalent group comprising at least an aliphatic part and an aromatic part of arylene-dialkylene or alkylene-diarylene type; and in particular A is preferentially a phenylene-dialkylene (such as phenylene-dimethylene or phenylene-diethylene) group or an alkylene-diphenylene (such as methylene-diphenylene) group.

Preferably, when A is interrupted, it is interrupted by at least one heteroatom chosen from oxygen, nitrogen and sulfur, preferably oxygen.

According to a preferential embodiment, A is substituted by at least one radical chosen from alkyl, cycloalkylalkyl, aryl, aralkyl, hydroxyl, alkoxy, amino and carbonyl radicals.

The radicals $R_1$, $R_2$, $R_3$ and $R_4$ represent, independently of one another, identical or different groups chosen from a hydrogen atom, alkyls having from 1 to 20 carbon atoms, cycloalkyls having from 5 to 24 carbon atoms, aryls having from 6 to 30 carbon atoms and aralkyls having from 7 to 25 carbon atoms; groups which can optionally be interrupted by one or more heteroatoms and/or substituted, it being possible for $R_1$ and $R_2$, on the one hand, and $R_3$ and $R_4$, on the other hand, to form, together with the carbon atoms of the ring to which they are attached, a ring chosen from aromatic, heteroaromatic or aliphatic rings comprising from 5 to 12 carbon atoms, preferably 5 or 6 carbon atoms. Preferably, $R_1$, $R_2$, $R_3$ and $R_4$ represent, independently of one another, identical or different groups chosen from a hydrogen atom and linear or branched alkyls having from 1 to 6 carbon atoms; groups which can optionally be substituted.

Preferably, in the composition according to the invention, the content of polydienophile is within a range extending from 0.2 to 100 phr, preferably from 0.2 to 50 phr. This is because, below 0.2 phr of polydienophile, the effect of the crosslinking is not substantial, whereas, above 100 phr of polydienophile, the polydienophile, the crosslinking agent, becomes predominant by weight with respect to the polymer matrix. Thus, preferentially, the content of polydienophile is within a range extending from 0.4 to 27 phr, preferably from 0.9 to 20 phr.

The polydienophiles of use for the requirements of the invention are either commercially available or readily prepared by a person skilled in the art according to well-known techniques, such as the routes described, for example, in the document Walter W. Wright and Michael Hallden-Abberton, "Polyimides", in *Ullmann's Encyclopedia of Industrial Chemistry*, 2002, Wiley-VCH, Weinheim. doi:10.1002/14356007.a21_253.

For example, mention may be made, as commercially available polydienophiles of use for the requirements of the invention, of bismaleimides and biscitraconimides.

In a preferred arrangement, the rubber composition according to the invention is devoid of a crosslinking system other than one of those described above. In particular, when the crosslinking system is based on one or more peroxide compounds, based on one or more polydienophile compounds or based on one or more diacid compounds, it is preferentially devoid of a vulcanization system, or contains less than 1 phr, preferably less than 0.5 phr and more preferentially less than 0.2 phr thereof. Likewise, the composition is preferentially devoid of any vulcanization activator or accelerator as known to a person skilled in the art, or contains less than 1 phr, preferably less than 0.5 phr and more preferentially less than 0.2 phr thereof.

When the crosslinking system preferentially included in the composition according to the invention is based on one or more compounds of thiuram polysulfide type, it preferentially does not require the presence of another crosslinking agent, or sulfur or other additional vulcanization agent (sulfur donor, vulcanization activator or accelerator). The composition of the invention can thus preferentially be devoid of sulfur or of such additional vulcanization agents, or else comprise only a very small amount, less than 1 phr, preferably less than 0.5 phr, more preferentially less than 0.2 phr, thereof.

According to another preferred embodiment, the composition of the invention can also be devoid of zinc or of zinc oxide (known as vulcanization activators), or else comprise only a very small amount, preferentially less than 1 phr, preferably less than 0.5 phr, more preferentially less than 0.2 phr, thereof.

In the preferred arrangements where the crosslinking system is not based on sulfur, the rubber composition in accordance with the invention is preferably devoid of molecular sulfur, or comprises less than 1 phr, preferably less than 0.5. phr and more preferentially less than 0.2 phr thereof.

Reinforcing Filler

The rubber composition of the invention can comprise one or more reinforcing fillers.

Use may be made of any type of "reinforcing" filler known for its abilities to reinforce a rubber composition which can be used in particular in the manufacture of tyres, for example an organic filler, such as carbon black, an inorganic filler, such as silica, or also a mixture of these two types of fillers.

All carbon blacks, in particular the blacks conventionally used in tyres or their treads, are suitable as carbon blacks. Among the latter, mention will more particularly be made of the reinforcing carbon blacks of the 100, 200 and 300 series, or the blacks of the 500, 600 or 700 series (ASTM D-1765-2017 grades), such as, for example, the N115, N134, N234, N326, N330, N339, N347, N375, N550, N683 and N772 blacks. These carbon blacks can be used in the isolated state, as available commercially, or in any other form, for example as support for some of the rubber additives used. The carbon blacks might, for example, be already incorporated in the diene elastomer, in particular isoprene elastomer, in the form of a masterbatch (see, for example, Applications WO 97/36724-A2 and WO 99/16600-A1).

Mention may be made, as example of organic fillers other than carbon blacks, of functionalized polyvinyl organic fillers, such as described in Applications WO2006/069792-A1, WO2006/069793-A1, WO2008/003434-A1 and WO2008/003435-A1.

"Reinforcing inorganic filler" should be understood here as meaning any inorganic or mineral filler, whatever its colour and its origin (natural or synthetic), also known as "white" filler, "clear" filler or even "non-black" filler, in contrast to carbon black, which is capable of reinforcing by itself alone, without means other than an intermediate coupling agent, a rubber composition intended for the manufacture of tyres. In a known way, certain reinforcing inorganic fillers can be characterized in particular by the presence of hydroxyl (—OH) groups at their surface.

Mineral fillers of the siliceous type, preferentially silica ($SiO_2$), or of the aluminous type, especially alumina ($Al_2O_3$), are suitable in particular as reinforcing inorganic fillers. The silica used can be any reinforcing silica known to a person skilled in the art, in particular any precipitated or fumed silica exhibiting a BET specific surface and a CTAB specific surface both of less than 450 $m^2/g$, preferably within a range extending from 30 to 400 $m^2/g$, in particular from 60 to 300 $m^2/g$. Any type of precipitated silica, in particular highly dispersible precipitated silicas (referred to as "HDS" for "highly dispersible" or "highly dispersible silica"), can be used. These precipitated silicas, which are or are not highly dispersible, are well known to a person skilled in the art. Mention may be made, for example, of the silicas described in Applications WO 03/016215-A1 and WO 03/016387-A1. Use may in particular be made, among commercial HDS silicas, of the Ultrasil® 5000GR and Ultrasil® 7000GR silicas from Evonik or the Zeosil® 1085GR, Zeosil® 1115 MP, Zeosil® 1165MP, Zeosil® Premium 200MP and Zeosil® HRS 1200 MP silicas from Solvay. Use may be made, as non-HDS silicas, of the following commercial silicas: the Ultrasil® VN2GR and Ultrasil® VN3GR silicas from Evonik, the Zeosil® 175GR silica from Solvay or the Hi-Sil EZ120G(-D), Hi-Sil EZ160G(-D), Hi-Sil EZ200G(-D), Hi-Sil 243LD, Hi-Sil 210 and Hi-Sil HDP 320G silicas from PPG.

In the present account, the BET specific surface is determined by gas adsorption using the Brunauer-Emmett-Teller method described in "The Journal of the American Chemical Society" (Vol. 60, page 309, February 1938), and more specifically according to a method adapted from Standard NF ISO 5794-1, Appendix E, of June 2010 [multipoint (5 point) volumetric method—gas: nitrogen—degassing under vacuum: one hour at 160° C.—relative pressure p/po range: 0.05 to 0.17].

For the inorganic fillers, such as silica, for example, the CTAB specific surface values were determined according to Standard NF ISO 5794-1, Appendix G, of June 2010. The process is based on the adsorption of CTAB (N-hexadecyl-N,N,N-trimethylammonium bromide) on the "external" surface of the reinforcing filler.

For carbon blacks, the STSA specific surface is determined according to Standard ASTM D6556-2016.

Mention may again be made, as other examples of inorganic fillers capable of being used in the rubber compositions of the invention, of mineral fillers of the aluminous type, in particular alumina ($Al_2O_3$), aluminium oxides, aluminium hydroxides, aluminosilicates, titanium oxides, silicon carbides or silicon nitrides, all of the reinforcing type as described, for example, in Applications WO 99/28376-A2, WO 00/73372-A1, WO 02/053634-A1, WO2004/003067-A1, WO2004/056915-A2, U.S. Pat. No. 6,610,261-B1 and U.S. Pat. No. 6,747,087-B2. Mention may in particular be made of the aluminas Baikalox A125 or CR125 (Baikowski), APA-100RDX (Condea), Aluminoxid C (Evonik) or AKP-G015 (Sumitomo Chemicals).

The physical state in which the reinforcing inorganic filler is provided is not important, whether it is in the form of a powder, of microbeads, of granules, or else of beads or any other appropriate densified form. Of course, reinforcing inorganic filler is also understood to mean mixtures of different reinforcing inorganic fillers, in particular of silicas as described above.

A person skilled in the art will know how to adjust the total content of reinforcing filler according to the use concerned, in particular according to the type of tyres concerned, for example a tyre for a motorbike, for a passenger vehicle or for a utility vehicle, such as a van or heavy-duty vehicle. Preferentially, the content of total reinforcing filler (carbon black and/or reinforcing inorganic filler, such as silica) is between 10 and 200 phr, more preferentially between 25 and 180 phr, the optimum being, in a known way, different according to the specific applications targeted.

In order to couple the reinforcing inorganic filler to the diene elastomer, use may be made, in a well-known way, of an at least bifunctional coupling agent (or bonding agent) intended to provide a satisfactory connection, of chemical and/or physical nature, between the inorganic filler (surface of its particles) and the diene elastomer. Use is made in particular of organosilanes or polyorganosiloxanes which are at least bifunctional. "Bifunctional" is understood to mean a compound having a first functional group capable of interacting with the inorganic filler and a second functional group capable of interacting with the diene elastomer. For example, such a bifunctional compound can comprise a first functional group comprising a silicon atom, the said first functional group being capable of interacting with the hydroxyl groups of an inorganic filler, and a second functional group comprising a sulfur atom, the said second functional group being capable of interacting with the diene elastomer.

Preferentially, the organosilanes are selected from the group consisting of organosilane polysulfides (symmetrical or asymmetrical), such as bis(3-triethoxysilylpropyl) tetrasulfide, abbreviated to TESPT, sold under the name Si69 by Evonik, or bis(3-triethoxysilylpropyl) disulfide, abbreviated to TESPD, sold under the name Si75 by Evonik, polyorganosiloxanes, mercaptosilanes, blocked mercaptosilanes, such as S-(3-(triethoxysilyl)propyl) octanethioate, sold by Momentive under the name NXT Silane. More preferentially, the organosilane is an organosilane polysulfide.

The content of coupling agent in the composition of the invention is preferentially less than or equal to 35 phr, it being understood that it is generally desirable to use as little as possible thereof. Typically, the content of coupling agent represents from 0.5% to 15% by weight, with respect to the amount of reinforcing inorganic filler. Its content is preferentially within a range extending from 0.5 to 20 phr, more preferentially within a range extending from 3 to 10 phr. This content is easily adjusted by a person skilled in the art according to the content of reinforcing inorganic filler used in the composition of the invention.

A person skilled in the art will understand that, as replacement for the reinforcing inorganic filler described above, use might be made of a reinforcing filler of another nature, provided that this reinforcing filler of another nature is covered with an inorganic layer, such as silica, or else comprises functional sites, in particular hydroxyl sites, at its surface which require the use of a coupling agent in order to establish the bond between this reinforcing filler and the diene elastomer. By way of example, mention may be made of carbon blacks partially or completely covered with silica, or of carbon blacks modified by silica, such as, without limitation, the fillers of Ecoblack® type of the CRX2000 series or of the CRX4000 series from Cabot Corporation.

Polyphenolic Compound

The composition according to the invention comprises at least one polyphenolic compound comprising at least three aromatic rings comprising 6 carbon atoms, each bearing at least two vicinal hydroxyl groups.

Vicinal is understood to mean that the two hydroxyl groups borne by the aromatic ring are in the ortho position with respect to each other.

The molar mass of the polyphenolic compound is preferentially greater than 600 g/mol, preferentially greater than 800 g/mol, in a preferred way greater than 1000 g/mol and in a very preferred way greater than 1200 g/mol.

Preferably, the polyphenolic compound is chosen from gallotannins, that is to say esters of gallic acid and of polyol, the polyol preferably being chosen from pentoses and hexoses. Preferably, the polyphenolic compound is chosen from esters of glucose and of gallic acid, in a preferred way chosen from polygalloyl glucoses comprising from 3 to 10 galloyl units, preferably comprising from 5 to 10 galloyl units. In a preferred way, the polyphenolic compound is chosen from trigalloyl glucoses, pentagalloyl glucoses and decagalloyl glucoses, and preferably from 1,2,6-trigalloyl glucose, 1,3,6-trigalloyl glucose, 1,2,3,4,6-pentagalloyl glucose and tannic acid (or beta-D-glucose pentakis(3,4-dihydroxy-5-((3,4,5-trihydroxybenzoyl)oxy)benzoate)). Very preferably, the polyphenolic compound is tannic acid.

The rubber composition according to the invention exhibits particularly advantageous characteristics of adhesion to a metallic reinforcing element, in particular by virtue of the presence of the polyphenolic compound, especially for the constitution of composites and very particularly of composites intended for tyres, this being the case whether the reinforcing element is or is not covered with a specific metal or alloy.

The rubber composition according to the invention preferentially comprises from 0.1 to 30 phr of polyphenolic compound, preferentially from 2 to 30 phr and very preferentially from 5 to 25 phr. Below 0.1 phr, the polyphenolic compound has no appreciable effect on the adhesion properties of the rubber composition according to the invention. Above 30 phr, significant gain is no longer observed.

Surprisingly, very good adhesion of the composition according to the invention to reinforcing cords is obtained without it being necessary to use cobalt salts. Thus, the composition according to the invention is preferentially devoid of cobalt salts, as they are known to a person skilled in the art, and the known effect of which is an improvement in the adhesion, or contains less than 1 phr, preferably less than 0.5 phr, more preferentially less than 0.2 phr and very preferentially less than 0.1 phr thereof.

Various Additives

The rubber compositions in accordance with the invention can also comprise all or part of the usual additives known to a person skilled in the art and generally used in rubber compositions for tyres, in particular compositions of internal layers, as defined subsequently in the present patent application, such as, for example, plasticizers (plasticizing oils and/or plasticizing resins), reinforcing or non-reinforcing fillers other than those mentioned above, pigments, protective agents, such as antiozone waxes, chemical antiozonants or antioxidants, anti-fatigue agents or reinforcing resins (such as described, for example, in Application WO 02/10269).

These compositions can also contain, in addition to the optional coupling agents, coupling activators, agents for covering the inorganic fillers or more generally processing aids capable, in a known way, by virtue of an improvement in the dispersion of the filler in the rubber matrix and of a lowering of the viscosity of the compositions, of improving their ability to be processed in the raw state, these agents being, for example, hydrolysable silanes, such as alkylalkoxysilanes (for example octyltriethoxysilane or silane octeo), polyols, polyethers, primary, secondary or tertiary amines, or hydroxylated or hydrolysable polyorganosiloxanes.

Preparation of the Rubber Compositions

The rubber composition in accordance with the invention is manufactured in appropriate mixers using preparation phases well known to a person skilled in the art:

a phase of thermomechanical working or kneading, which can be carried out in a single thermomechanical stage during which all the necessary constituents, in particular the elastomeric matrix, the polyphenolic compound, the fillers and the optional other various additives, are introduced into an appropriate mixer, such as a standard internal mixer (for example of 'Banbury' type). The incorporation of the filler in the elastomer can be carried out in one or more goes by thermomechanically kneading. In the case where the filler, in particular the carbon black, is already incorporated, in all or in part, in the elastomer in the form of a masterbatch, as is described, for example, in Applications WO 97/36724 and WO 99/16600, it is the masterbatch which is directly kneaded and, if appropriate, the other elastomers or fillers present in the composition which are not in the masterbatch form, and also the optional other various additives, are incorporated.

The thermomechanical kneading is carried out at high temperature, up to a maximum temperature of between 110° C. and 200° C., preferably between 130° C. and 185° C., for a period of time generally of between 2 and 10 minutes.

a second phase of mechanical working can subsequently be carried out in an external mixer, such as an open mill, after cooling the mixture obtained during the first phase down to a lower temperature, typically of less than 120° C., for example between 40° C. and 100° C.

The optional crosslinking system will be added, in accordance with the knowledge of a person skilled in the art, during the first or the second phase, when the latter is carried out. For example, a crosslinking system based on polyacids or on polydienophiles will typically be added during the first phase. A crosslinking system based on peroxides or on sulfur will typically be added during the second phase.

The final composition thus obtained is subsequently calendered, for example in the form of a sheet or of a plaque, in particular for a laboratory characterization, or else extruded in the form of a rubber semi-finished product (or profiled element).

The composition can be either in the raw state (before crosslinking or vulcanization) or in the cured state (after crosslinking or vulcanization), can be a semi-finished product which can be used in a tyre.

The curing can be carried out, in a way known to a person skilled in the art, at a temperature generally of between 130° C. and 200° C., under pressure, for a sufficient time which can vary, for example, between 5 and 90 min as a function in particular of the curing temperature, of the crosslinking system adopted, of the kinetics of crosslinking of the composition under consideration or also of the size of the tyre.

Composite

The invention also relates to a composite based on at least one reinforcing element and on a rubber composition according to the invention.

The expression composite "based at least on a reinforcing element and on a composition according to the invention" should be understood as meaning a composite comprising the reinforcing element and the said composition, it having been possible for the composition to react with the surface of the reinforcing element during the various phases of manufacture of the composite, in particular during the crosslinking of the composition or during the manufacture of the composite before crosslinking of the composition.

The said reinforcing element is a threadlike element. It can be totally or partly metallic or textile.

In particular, the said reinforcing element can be of textile nature, that is to say made of an organic material, in particular a polymeric material, or an inorganic material, such as, for example, glass, quartz, basalt or carbon. The polymeric materials can be of the thermoplastic type, such as, for example, aliphatic polyamides, in particular polyamides 6,6, and polyesters, in particular polyethylene terephthalate. The polymeric materials can be of the non-thermoplastic type, such as, for example, aromatic polyamides, in particular aramid, and cellulose, either natural or artificial, in particular rayon.

In a specific arrangement, the said reinforcing element comprises a metallic surface.

The metallic surface of the reinforcing element constitutes at least a part and preferentially the whole of the surface of the said element and is intended to come directly into contact with the composition according to the invention. Preferably, the reinforcing element is metallic, that is to say formed of a metallic material.

The composition according to the invention coats at least a part of the reinforcing element, preferentially the whole of the said element.

According to a first alternative form of the invention, the metallic surface of the reinforcing element is made of a different material from the remainder of the reinforcing element. In other words, the reinforcing element is made of a material which is at least partly, preferentially completely, covered with a metallic layer which constitutes the metallic surface. The material at least partly, preferentially completely, covered by the metallic surface is metallic or non-metallic, preferably metallic, in nature.

According to a second alternative form of the invention, the reinforcing element is made of one and the same material, in which case the reinforcing element is made of a metal which is identical to the metal of the metallic surface.

According to one embodiment of the invention, the metallic surface comprises a metal selected from the group consisting of iron, copper, zinc, tin, aluminium, cobalt, nickel and the alloys comprising at least one of these metals. The alloys can, for example, be binary or ternary alloys, such as steel, bronze and brass. Preferably, the metal of the metallic surface is iron, copper, tin, zinc or an alloy comprising at least one of these metals. More preferentially, the metal of the metallic surface is steel, brass (Cu—Zn alloy), zinc or bronze (Cu—Sn alloy), more preferably still brass or steel and very preferably brass.

In the present patent application, the expression "the metal of the metallic surface is the metal denoted hereinafter" amounts to saying that the metallic surface is made of metal denoted hereinafter. For example, the expression "the metal of the metallic surface is brass" written above means that the metallic surface is made of brass. As certain metals are subject to oxidation on contact with ambient air, the metal may be partly oxidized.

When the metallic surface is made of steel, the steel is preferentially a carbon steel or a stainless steel. When the steel is a carbon steel, its carbon content is preferably between 0.01% and 1.2% or between 0.05% and 1.2%, or else between 0.2% and 1.2%, in particular between 0.4% and 1.1%. When the steel is stainless, it preferably comprises at least 11% of chromium and at least 50% of iron.

According to a preferred embodiment, the composite is a reinforced product which comprises several reinforcing elements as defined above and a calendering rubber in which the reinforcing elements are embedded, the calendering rubber consisting of the rubber composition according to the invention. According to this embodiment, the reinforcing elements are generally arranged side by side along a main direction. For an application envisaged in the tyre, the composite can thus constitute a tyre reinforcement.

The composite in accordance with the invention can be in the raw state (before crosslinking of the rubber composition) or in the cured state (after crosslinking of the rubber composition). The composite is cured after bringing the reinforcing element(s) into contact with the rubber composition according to the invention.

The composite can be manufactured by a process which comprises the following stages:
 producing two layers of the composition according to the invention,
 sandwiching the reinforcing element(s) in the two layers by depositing it (them) between the two layers,
 if appropriate, curing the composite.

Alternatively, the composite can be manufactured by depositing the reinforcing element on a portion of a layer, the layer is then folded over on itself to cover the reinforcing element, which is thus sandwiched over its entire length or a part of its length.

The layers can be produced by calendering. During the curing of the composite, the rubber composition is crosslinked.

When the composite is intended to be used as reinforcement in a tyre, the curing of the composite generally takes place during the curing of the casing of the tyre.

Tyre

The tyre, which is another subject-matter of the invention, has the essential characteristic of comprising the composition or the composite in accordance with the invention. The tyre can be in the raw state (before crosslinking of the rubber composition) or in the cured state (after crosslinking of the rubber composition). Generally, during the manufacture of the tyre, the composition or the composite is deposited in the raw state (that is to say, before crosslinking of the rubber composition) in the structure of the tyre before the stage of curing the tyre.

The invention relates particularly to tyres intended to equip motor vehicles of passenger vehicle type, SUVs ("Sport Utility Vehicles"), or two-wheel vehicles (in particular motorcycles), or aircraft, or also industrial vehicles chosen from vans, heavy-duty vehicles, that is to say underground trains, buses, heavy road transport vehicles (lorries, tractors, trailers) or off-road vehicles, such as heavy agricultural vehicles or civil engineering vehicles, and others.

It is possible to define, within the tyre, three types of regions:
 The radially exterior region in contact with the ambient air, this region being essentially composed of the tread and of the external sidewall of the tyre. An external sidewall is an elastomeric layer positioned outside the carcass reinforcement with respect to the internal cavity of the tyre, between the crown and the bead, so as to completely or partially cover the region of the carcass reinforcement extending from the crown to the bead.
 The radially interior region in contact with the inflation gas, this region generally being composed of the layer airtight to the inflation gases, sometimes known as interior airtight layer or inner liner.
 The internal region of the tyre, that is to say that between the exterior and interior regions. This region includes layers or plies which are referred to here as internal layers of the tyre. These are, for example, carcass plies, tread underlayers, tyre belt plies or any other layer which is not in contact with the ambient air or the inflation gas of the tyre.

The composition defined in the present description is particularly well suited to the internal layers of the tyres.

Thus, the invention also relates to a tyre comprising an internal layer comprising a composition or a composite according to the present invention. According to the invention, the internal layer can be selected from the group consisting of carcass plies, crown plies, bead-wire fillings, crown feet, decoupling layers, the tread underlayer and the combinations of these internal layers. Preferably, the internal layer is selected from the group consisting of carcass plies, crown plies, bead-wire fillings, crown feet, decoupling layers and the combinations of these internal layers.

In addition to the subject-matters described above, the invention relates to at least one of the subject-matters described in the following points:

1. A rubber composition based on at least one elastomer, a reinforcing filler, a crosslinking system and at least one polyphenolic compound, the polyphenolic compound comprising at least three aromatic rings comprising 6 carbon atoms, each bearing at least two vicinal hydroxyl groups.
2. A composition according to the preceding point, in which the molar mass of the said polyphenolic compound is greater than 600 g/mol.
3. A rubber composition according to any one of the preceding points, in which the polyphenolic compound is chosen from gallotannins, preferably from esters of gallic acid and of a polyol chosen from pentoses and hexoses.
4. A rubber composition according to any one of the preceding points, in which the polyphenolic compound is chosen from esters of glucose and of gallic acid, in a preferred way chosen from polygalloyl glucoses comprising from 3 to 10 and preferably from 5 to 10 galloyl units.
5. A rubber composition according to any one of the preceding points, in which the polyphenolic compound is chosen from trigalloyl glucoses, pentagalloyl glucoses and decagalloyl glucoses, preferably chosen from 1,2,6-trigalloyl glucose, 1,3,6-trigalloyl glucose, 1,2,3,4,6-pentagalloyl glucose and tannic acid.
6. A composition according to any one of the preceding points, in which the content of polyphenolic compound in the rubber composition is between 0.1 and 30 phr.
7. A composition according to any one of the preceding points, in which the said composition is devoid of cobalt salts or contains less than 1 phr thereof.
8. A rubber composition according to any one of the preceding points, comprising at least one elastomer chosen from diene, olefin and thermoplastic elastomers and their mixtures.
9. A rubber composition according to the preceding point, comprising at least one diene elastomer or one thermoplastic elastomer.
10. A rubber composition according to the preceding point, comprising a crosslinking system based on one or more peroxide compounds, the said peroxide compound(s) representing from 0.01 to 10 phr.
11. A rubber composition according to point 9, comprising a crosslinking system based on one or more compounds of thiuram polysulfide type, the said thiuram polysulfide compound(s) representing from 0.5 to 15 phr.
12. A rubber composition according to any one of points 1 to 9, comprising at least one functionalized elastomer.
13. A rubber composition according to the preceding point, comprising at least one epoxide-functionalized elastomer.
14. A rubber composition according to the preceding point, comprising a crosslinking system based on one or more polyacid compounds, the said polyacid compound(s) representing from 0.2 to 100 phr.
15. A rubber composition according to point 12, comprising at least one functionalized elastomer comprising a conjugated diene function.
16. A rubber composition according to the preceding point, comprising a crosslinking system based on one or more polydienophiles.
17. A rubber composition according to point 8, comprising at least one thermoplastic elastomer.
18. A rubber composition according to the preceding point, not comprising a crosslinking system.
19. A rubber composition according to any one of the preceding points, the said composition being devoid of molecular sulfur or comprising less than 1 phr thereof.
20. A rubber composition according to point 9, comprising a sulfur-based crosslinking system, used at a preferential content of between 0.5 and 12 phr.
21. A rubber composition according to any one of the preceding points, the said composition being devoid of zinc or of zinc oxide, or else comprising only a very small amount, preferentially less than 1 phr, preferably less than 0.5 phr, more preferentially less than 0.2 phr, thereof.
22. A rubber composition according to any one of the preceding points, in which the reinforcing filler comprises carbon black, silica or a mixture of carbon black and of silica.
23. A rubber composition according to any one of the preceding points, in which the content of reinforcing filler is between 20 and 200 phr.
24. A composite based on at least one reinforcing element and on a composition according to any one of the preceding points.
25. A composite according to the preceding point, in which the reinforcing element comprises a metallic surface.
26. A composite according to either one of points 24 and 25, in which the metallic surface of the said reinforcing element comprises a metal selected from the group consisting of iron, copper, zinc, tin, aluminium, cobalt, nickel and the alloys comprising at least one of these metals.
27. A composite according to any one of points 24 to 26, in which the metal of the metallic surface is iron, copper, tin, zinc or an alloy comprising at least one of these metals.
28. A composite according to any one of points 24 to 27, in which the metal of the metallic surface is brass or steel.
29. A tyre comprising a composition according to any one of points 1 to 23.
30. A tyre comprising an internal layer comprising a composition according to any one of points 1 to 23.

EXAMPLES

The following procedure is used to prepare the different rubber compositions: the elastomer and then all the other constituents of the mixture are successively introduced into an internal mixer (final degree of filling: approximately 70% by volume), the initial vessel temperature of which is approximately 60° C. Thermomechanical working is then carried out in one stage until a maximum "dropping" temperature of 150° C. is reached. The mixture thus obtained is recovered and cooled on an external mixer (homofinisher) at 30° C., everything being mixed.

The crosslinking system is added, in accordance with the knowledge of a person skilled in the art, during the first phase for the polyacid crosslinking system and during the second phase for the crosslinking systems based on peroxides and on sulfur.

The rubber compositions prepared are presented in Tables 1, 2 and 3.

The quality of the bonding between the rubber composition and a reinforcing element is determined by a test in which the force required to extract sections of individual threads exhibiting a metallic surface from the crosslinked rubber composition is measured. To this end, composites are prepared in the form of a test specimen containing, on the one hand, individual metallic threads as reinforcing element exhibiting a metallic surface and, on the other hand, an elastomer mixture comprising the rubber composition crosslinked after being brought into contact with the reinforcing element.

Preparation of the Test Specimens

The rubber compositions are used to prepare a composite in the form of a test specimen according to the following protocol:

A block of rubber, consisting of two plaques applied to each other before curing, is prepared. The two plaques of the block consist of the same rubber composition. It is during the preparation of the block that the individual threads are trapped between the two plaques in the raw state, an equal distance apart and while leaving to protrude, on either side of these plaques, an end of the individual thread having a length sufficient for the subsequent tensile test. The block comprising the individual threads is then cured. By way of example, in the present case, the block is cured at 170° C. for a time varying from 5 min to 90 min depending on the composition under a pressure of 5.5 tonnes.

The individual threads are threads made of bright steel, or which are covered with brass or with zinc. Their diameter is 1.75 mm; the thickness of the brass or zinc coating is from 200 nm to 1 µm.

Adhesion Test

On conclusion of the curing, the test specimen thus formed of the crosslinked block and of the individual threads is placed in the jaws of a tensile testing machine adapted in order to make it possible to test each section in isolation, at a given speed and a given temperature (for example, in the present case, at 100 mm/min and ambient temperature).

The levels of adhesion are characterized by measuring the "tearing-out" force for tearing out the sections from the test specimen.

The results are expressed in base 100 with respect to a control test specimen which contains individual threads identical in nature to the test specimen tested. In Tables 1 to 3, this control test specimen is made respectively from the composition "C1", "C3" and "C7".

A value greater than that of the control test specimen, arbitrarily set at 100, indicates an improved result, that is to say a tearing-out force greater than that of the test specimen.

The results of the adhesion tests carried out on control test specimens and on test specimens in accordance with the invention are presented in Tables 1 to 3.

As they exhibit values of greater than 100 in the adhesion test, the composites in accordance with the invention exhibit a greatly improved resistance to tearing out, whether or not the reinforcing element is covered with a specific metal or alloy.

Peroxide Crosslinking

TABLE 1

|  | C1 | C2 | I3 | I2 | I1 |
|---|---|---|---|---|---|
| NR (1) | 100 | 100 | 100 | 100 | 100 |
| Carbon black (2) | 50 | 50 | 50 | 50 | 50 |
| Dicumyl peroxide (3) | 2.5 | 2.5 | 2.5 | 2.5 | 2.5 |
| Catechol-grafted diene polymer (4) | 0 | 15 | 0 | 0 | 0 |
| Tannic acid (5) | 0 | 0 | 5 | 15 | 25 |
| Adhesion tests results | | | | | |
| Brass | 100 | 2080 | 1700 | 4820 | 3880 |
| Steel | 100 | 245 | 626 | 550 | 581 |
| Zinc | 100 | n.m. | n.m. | 1467 | 3100 |

All the compositions are given in phr;
n.m. = not measured
(1) Natural rubber
(2) N326
(3) Supplied by Sigma-Aldrich
(4) Poly(isoprene-co-dihydroxycinnamic methacrylate), Mn = 6500 g/mol, Mw = 15 300 g/mol, 3,4-dihydroxyaryl group 0.92 meq/g, supplied by Specific Polymers
(5) CAS 1401-55-4, supplied by Sigma-Aldrich It is noted that the composition "C1" does not comprise any specific polyphenolic compound. The cathecol-grafted diene polymer corresponds to the teaching of WO2017/081387.

Diacid Crosslinking

TABLE 2

|  | C3 | C4 | C5 | C6 | I1 |
|---|---|---|---|---|---|
| eNR25 (1) | 100 | 100 | 100 | 100 | 100 |
| Silica 160 MP (2) | 60 | 60 | 60 | 60 | 60 |
| Silane Octeo (3) | 4.8 | 4.8 | 4.8 | 4.8 | 4.8 |
| 6PPD (4) | 1.5 | 1.5 | 1.5 | 1.5 | 1.5 |
| Diacid PBACN (5) | 24.8 | 24.8 | 24.8 | 24.8 | 24.8 |
| Imidazole BMI (6) | 2.2 | 2.2 | 2.2 | 2.2 | 2.2 |

TABLE 2-continued

|  | C3 | C4 | C5 | C6 | I1 |
|---|---|---|---|---|---|
| 3,4-Dihydroxyhydrocinnamic acid (7) | 0 | 5 | 0 | 0 | 0 |
| Glucose (8) | 0 | 0 | 2 | 0 | 0 |
| Gallic acid (9) | 0 | 0 | 0 | 5 | 0 |
| Tannic acid (10) | 0 | 0 | 0 | 0 | 5 |
| Adhesion tests results | | | | | |
| Brass | 100 | n.m. | 125 | 400 | 402 |
| Steel | 100 | 172 | 152 | 161 | 281 |

All the compositions are given in phr
(1) Epoxidized Natural Rubber, ENR-25 from Guthrie Polymer;
(2) Silica 160 MP, Zeosil 1165MP from Rhodia;
(3) Dynasylan Octeo from Degussa;
(4) N-(1,3-Dimethylbutyl)-N-phenyl-para-phenylenediamine (Santoflex 6-PPD from Flexsys);
(5) Poly(acrylonitrile-co-butadiene), dicarboxyterminated, Sigma-Aldrich, Ref. 418870, Mn = 3800 g/mol;
(6) 1-Benzyl-2-methylimidazole, CAS = 13750-62-4 from Sigma-Aldrich;
(7) CAS = 1078-61-1 from Sigma-Aldrich;
(8) CAS = 50-99-7 from Sigma-Aldrich;
(9) CAS = 149-91-7 from Sigma-Aldrich;
(10) CAS = 1401-55-4 from Sigma-Aldrich.

It is noted that the composition "C3" does not comprise any specific polyphenolic compound.

Sulfur Crosslinking

TABLE 3

|  | C7 | I1 |
|---|---|---|
| NR (1) | 100 | 100 |
| N326 (2) | 50 | 50 |
| 6PPD (3) | 1.5 | 1.5 |
| ZnO (4) | 5 | 5 |
| Stearic acid (5) | 1.5 | 1.5 |
| CBS (6) | 4 | 4 |
| Insoluble sulfur | 1 | 1 |
| Tannic acid (7) | 0 | 25 |
| Adhesion tests results | | |
| Brass | 100 | 174 |
| Steel | 100 | 128 |
| Zinc | 100 | 136 |

All the compositions are given in phr
(1) Natural Rubber;
(2) Carbon black N326 (according to Standard ASTM D-1765);
(3) N-(1,3-Dimethylbutyl)-N-phenyl-para-phenylenediamine (Santoflex 6-PPD from Flexsys);
(4) Zinc oxide, industrial grade, Umicore;
(5) Stearin (Pristerene 4931 from Uniqema);
(6) N-Cyclohexyl-2-benzothiazolesulfenamide (Santocure CBS) from Flexsys;
(7) CAS = 1401-55-4 from Sigma-Aldrich.

It is noted that the composition "C7" does not comprise any specific polyphenolic compound.

The invention claimed is:
1. A composite based on:
   at least one reinforcing element comprising a metallic surface; and
   a rubber composition based on at least:
      an elastomer;
      a reinforcing filler;
      a crosslinking system; and
      at least one polyphenolic compound, the polyphenolic compound comprising at least three aromatic rings comprising 6 carbon atoms, each bearing at least two vicinal hydroxyl groups, wherein the at least one polyphenolic compound is selected from the group consisting of gallotannins.
2. The composite according to claim 1, wherein the at least one polyphenolic compound is selected from the group consisting of esters of glucose and of gallic acid.

3. The composite according to claim 1, wherein a content of the at least one polyphenolic compound in the rubber composition is between 0.1 and 30 phr.

4. The composite according to claim 1, wherein the rubber composition is devoid of cobalt salts or contains less than 1 phr of cobalt salts.

5. The composite according to claim 1, wherein the elastomer is selected from the group consisting of diene, olefin, thermoplastic elastomers and mixtures thereof.

6. The composite according to claim 1, wherein the rubber composition is devoid of molecular sulfur or comprises less than 1 phr of molecular sulfur.

7. The composite according to claim 1, wherein the rubber composition is devoid of zinc or of zinc oxide or comprises less than 1 phr of zinc or of zinc oxide.

8. The composite according to claim 1, wherein the reinforcing filler comprises carbon black, silica or a mixture of carbon black and of silica.

9. The composite according to claim 1, wherein the metal of the metallic surface is iron, copper, tin, zinc or an alloy comprising at least one of iron, copper, tin, and zinc.

10. A tire comprising the composite according to claim 1.

11. A tire comprising an internal layer comprising the composite according to claim 1.

* * * * *